US010260766B2

(12) United States Patent
Kim

(10) Patent No.: US 10,260,766 B2
(45) Date of Patent: Apr. 16, 2019

(54) AIR HANDLING SYSTEM AND AIR HANDLING METHOD USING THE SYSTEM

(71) Applicant: NHN Entertainment Corporation, Seongnam-si (KR)

(72) Inventor: Joo-Hwan Kim, Seongnam-si (KR)

(73) Assignee: NHN Entertainment Corporation, Seongnam-si (KR)

(*) Notice: Subject to any disclaimer, the term of this patent is extended or adjusted under 35 U.S.C. 154(b) by 234 days.

(21) Appl. No.: 15/171,891

(22) Filed: Jun. 2, 2016

(65) Prior Publication Data

US 2016/0356517 A1    Dec. 8, 2016

(30) Foreign Application Priority Data

Jun. 3, 2015  (KR) .................. 10-2015-0078552

(51) Int. Cl.
 F24F 11/00    (2018.01)
 F24F 11/30    (2018.01)
 (Continued)

(52) U.S. Cl.
 CPC ............ F24F 11/30 (2018.01); F24F 5/0035 (2013.01); F24F 7/08 (2013.01);
 (Continued)

(58) Field of Classification Search
 CPC .... F24F 11/30; F24F 2110/10; F24F 2110/20; Y02B 30/545
 (Continued)

(56) References Cited

U.S. PATENT DOCUMENTS 4,272,462 A * 6/1981 Butt .......................... F28D 5/02
                                                            165/166
4,312,191 A * 1/1982 Biagini .................. B64D 13/06
                                                             62/172
(Continued)

FOREIGN PATENT DOCUMENTS

JP       54-045756      9/1979
JP       1994-159731    6/1994
(Continued)

OTHER PUBLICATIONS

The Japanese Office Action dated Jun. 22, 2017, issued in Japanese Patent Application No. 2016-112091 (with unverified machine translation).

*Primary Examiner* — Henry T Crenshaw
(74) *Attorney, Agent, or Firm* — H.C. Park & Associates, PLC

(57) ABSTRACT

An air handling system includes an indirect heat exchanger, a first circulation equipment, a second circulation equipment, a third circulation equipment, a direct adjusting apparatus, a first sensor configured to detect a state of a first air, a second sensor configured to detect a state of a second air, and a control apparatus configured to receive the state of the first air, receive the state of the second air, and control at least one of a circulation of the first air within the first circulation equipment, a circulation of second air within the second circulation equipment, a liquid injection by a vaporization part, an exchange of the second air with the first air with the third circulation equipment, and a direct adjustment of the second air with the direct adjusting apparatus based on the received state of the first air and the received state of the second air.

27 Claims, 12 Drawing Sheets

(51) Int. Cl.
    *F24F 5/00*         (2006.01)
    *F24F 7/08*         (2006.01)
    *F24F 110/20*     (2018.01)
    *F24F 110/10*     (2018.01)
    *F24F 1/00*         (2019.01)

(52) U.S. Cl.
    CPC ... *F24F 2001/0092* (2013.01); *F24F 2110/10* (2018.01); *F24F 2110/20* (2018.01); *Y02B 30/545* (2013.01)

(58) Field of Classification Search
    USPC .......................................................... 62/97
    See application file for complete search history.

(56) References Cited

U.S. PATENT DOCUMENTS

| | | | | |
|---|---|---|---|---|
| 4,667,480 A | * | 5/1987 | Bessler | B60H 1/3205<br>318/254.1 |
| 4,897,798 A | * | 1/1990 | Cler | G05D 23/1917<br>700/276 |
| 5,924,486 A | * | 7/1999 | Ehlers | G05D 23/1923<br>165/238 |
| 8,374,725 B1 | * | 2/2013 | Ols | F24F 13/1426<br>700/277 |
| 9,420,725 B2 | | 8/2016 | Honda et al. | |
| 2008/0099570 A1 | * | 5/2008 | Krebs | F23N 5/203<br>236/46 R |
| 2011/0138835 A1 | * | 6/2011 | Takayama | F24F 1/42<br>62/305 |
| 2012/0064923 A1 | * | 3/2012 | Imes | G05B 15/02<br>455/457 |
| 2013/0019961 A1 | * | 1/2013 | Rogers | F24F 11/30<br>137/334 |
| 2015/0096714 A1 | | 4/2015 | Dagley et al. | |

FOREIGN PATENT DOCUMENTS

| | | |
|---|---|---|
| JP | 2010-145012 | 1/2010 |
| JP | 2010-025377 | 2/2010 |
| JP | 2010-223487 | 10/2010 |
| JP | 2011-021848 | 2/2011 |
| JP | 2012-42122 | * 3/2012 |
| JP | 2012-042122 | 3/2012 |
| JP | 2013-148254 | 8/2013 |

\* cited by examiner

FIG. 12

| Zone | condition | time | ratio | control method |
|---|---|---|---|---|
| Z1 | DB : less than 15°C | 4458 | 50.9% | first control method |
| Z2 | DB: equal to or greater than 15°C and less than DB 18°C | 569 | 6.5% | |
| Z3 | DB: equal to or greater than 18°C and less than DB 27°C; RH : less than 20% | 9 | 0.1% | |
| Z4 | DB: equal to or greater than 18°C; RH : greater than 80%; DP: equal to or less than 21°C | 667 | 7.6% | second control method |
| Z5 | DP: greater than 21°C; heat exchange efficiency line : equal to or less than (60% IEC 23°C) | 144 | 1.6% | |
| Z6 | DP: greater than 27°C; heat exchange efficiency line : equal to or less than (60% IEC 23°C) ; DP: equal to or less than 21°C | 68 | 0.8% | |
| Z7 | DB 18°C ~ 27°C, RH 20% ~80%; DP: equal to or less than 21°C | 1888 | 21.6% | third control method |
| Z8 | greater than heat exchange efficiency line (60% IEC 23°C), and excluding Z7(seventh area) | 957 | 10.9% | fourth control method |
| | sum | 8760 | 100.0% | |

AIR HANDLING SYSTEM AND AIR HANDLING METHOD USING THE SYSTEM

CROSS REFERENCE TO RELATED APPLICATION

This application claims priority from and the benefit of Korean Patent Application No. 10-2015-0078552, filed on Jun. 3, 2015, which is hereby incorporated by reference for all purposes as if fully set forth herein.

BACKGROUND

Field

Exemplary embodiments relate to an air handling system and air handling method using the air handling system. More particularly, exemplary embodiments relate to an air handling system and air handling method using the air handling system which is capable of controlling environmental parameters (e.g., air temperature and humidity) within a closed space.

Discussion of the Background

Controlling the climate of indoor spaces is important to maintain equipment or products that are sensitive to temperature and humidity changes. Such equipment may include climate sensitive products, computers, servers, or other factory equipment. However, controlling the climate of an indoor space can be energy intensive, especially during extremely hot or humid seasons (e.g., summer). The intense energy required for air handling systems designed to control climates have may cause high strains on operating budgets as well as cause additional damage to the environment from carbon emissions if hydrocarbons (e.g., oil, gas, or coal) are a source fuel for the energy consumption.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an air handling system configured to an air handling process in a target space using minimal energy consumption. Exemplary embodiments also provide an air handling method for the air handling system that uses a minimal amount of energy.

Additional aspects will be set forth in the detailed description which follows, and, in part, will be apparent from the disclosure, or may be learned by practice of the inventive concept.

Exemplary embodiments provide an air handling system including an indirect heat exchanger including a heat exchange part with a vaporization part configured to inject liquid into the heat exchange part, a first heat exchange path, and a second heat exchange path configured to exchange heat with the first heat exchange path and the vaporization part. An exemplary embodiments of an air handling system also include a first circulation equipment connected to the first heat exchange path where the first circulation equipment is configured to circulate a first air through the first heat exchange path, a second circulation equipment connected to a target space and the second heat exchange path where the second circulation equipment is configured to circulate a second air through the second heat exchange path, a third circulation equipment configured to exchange the second air with the first air such that the first air is provided to the target space and the second air is emitted from the target space, a direct adjusting apparatus configured to directly adjust the temperature of the second air, a first sensor configured to detect a state of the first air comprising a temperature of the first air, a second sensor configured to detect a state of the second air comprising a temperature of the second air, and a control apparatus. The control apparatus may be configured to receive the state of the first air from the first sensor, receive the state of the second air from the second sensor, and control at least one of a circulation of the first air within the first circulation equipment, a circulation of second air within the second circulation equipment, a liquid injection by the vaporization part, an exchange of the second air with the first air with the third circulation equipment, and a direct adjustment of the second air with the direct adjusting apparatus based on the received state of the first air detected by the first sensor and the received state of the second air detected by the second sensor.

The control apparatus may further be configured to control at least one of the circulation of the first air within the first circulation equipment, the circulation of second air within the second circulation equipment, the liquid injection by the vaporization part, the exchange of the second air with the first air with the third circulation equipment, and the direct adjustment of the second air with the direct adjusting apparatus such that the state of the second air within the target space is maintained within a control condition area of a psychrometric chart.

The control apparatus may be controlled by at least one of a first control method which controls the circulation of first air within the first circulation equipment and the circulation of second air within the second circulation equipment such that heat of the first air and the second air are exchanged in the heat exchange part, a second control method which controls the liquid injection in addition to the first control method, a third control method which controls the exchange of the second air with the first air within the third circulation equipment, and a fourth control method which controls the direct adjustment of the direct adjusting apparatus in addition to the second method.

At least one of the circulation of the first air within the first circulation equipment, the circulation of the second air within the second circulation equipment, or the exchange of the second air with the first air within the third circulation equipment may include a circulation by natural convection or a circulation by forced air.

The control condition area may be defined by the state of second air that is equal to or greater than a first temperature, equal to or less than a second temperature, and equal to or less than a reference dew point.

The control apparatus may be configured to operate according to the first control method when the received state of the first air corresponds to a first zone that is less than a third temperature, which is less than the first temperature of the psychrometric chart.

The control apparatus may be configured to operate according to the second control method when the control apparatus determines that the state of the first air corresponds to at least one of a second zone that is equal to or greater than the third temperature and equal to and less than the first temperature, a third zone that is equal to or greater than the first temperature, equal to and less than the second temperature, and equal to and less than a first humidity, a fourth zone that is equal to or greater than the first temperature, equal to and less than the second temperature, greater than a second humidity, and equal to and less than the reference dew point, a fifth zone that is greater than the reference dew point, equal to and less than a heat exchange efficiency line of the psychrometric chart which indicates an efficiency of heat exchange between the first air and the second air of the heat exchange part, and a sixth zone that is greater than the second temperature, equal to and less than the reference dew point and equal to and less than a heat exchange efficiency line of the psychrometric chart.

The control apparatus may be configured to operate according to the third control method when the control apparatus determines that the state of the first air corresponds to a seventh zone within the psychrometric chart matching the control condition area.

The control apparatus may be configured to operate according to the fourth control method when the control apparatus determines that the state of the first air corresponds to an eighth zone that is outside from the control condition area and is greater than the heat exchange efficiency line of the psychrometric chart which indicates an efficiency of heat exchange between the first air and the second air of the heat exchange part.

The first temperature may be a range of 17 degrees Celsius to 19 degrees Celsius, the second temperature may be a range of 26 degrees Celsius to 28 degrees Celsius, the third temperature may be a range of 14 degrees Celsius to 16 degrees Celsius, the first humidity may be a range of 19% to 21%, the second humidity may be a range between 79% and 81%, and the reference dew point may be a range of 20 degrees Celsius to 22 degrees Celsius.

The indirect heat exchanger may also include a heat transfer medium disposed between the first heat exchange path and the second heat exchange path. The indirect heat exchanger may be configured to transfer the heat between the first air flowing through the first heat exchange path and the second air flowing through the second heat exchange path. The vaporization part may be further configured to inject the liquid on a surface of the heat transfer medium which faces the first heat exchange path.

The first circulation equipment may include a first supplying path part connected to an entrance of the first heat exchange path, a first outlet path part connected to an exit of the first heat exchange path, and a first circulation control part disposed in at least one of the first supplying path part and the first outlet path part, the first circulation control part is configured to control the circulation of the first air within the first heat exchange path based on a signal received from the control apparatus. The first circulation control part may include a first circulation fan configured to circulate the first air.

The second circulation equipment may include a second supplying path part connected to an exit of the target space and an entrance of the second heat exchange path, a second outlet path part connected to an inlet of the target space and an exit of the second heat exchange path, and a second circulation control part disposed in at least one of the second supplying path part, and the second outlet path part, the second circulation control part configured to control the circulation of the second air of the second heat exchange path based on a signal received from the control apparatus. The second circulation control part may include a second circulation fan which circulates the second air. The direct adjusting apparatus may be disposed inside the second outlet path part.

The third circulation equipment may include an air intake part configured to supply the first air to the target space and an air outlet part configured to emit the second air from the target space.

The air intake part may include an intake path connected to at least one of the target space and the second circulation equipment and an intake control unit disposed inside the intake path, the intake control unit configured to control the supply of the first air to the target space based on a signal from the control apparatus.

The air outlet part may include an outlet path connected to at least one of the target space and the second circulation equipment and an outlet control unit disposed inside the outlet path, the outlet control unit configured to control the emission of the second air based on a signal from the control apparatus.

The direct adjusting apparatus may include an air conditioner configured to directly cool the second air. The direct adjusting apparatus may be disposed inside at least one of the target space and the second circulation equipment.

The second sensor may be disposed inside the target space.

Exemplary embodiments also provide a method of handling air of an air handling system, including, receiving, by a control apparatus, a state of a first air from a first sensor, the state of the first air comprising a temperature of the first air. Receiving, by the control apparatus, a state of a second air within a target space, the state of the second air comprising a temperature of the second air. Determining, by the control apparatus, whether the state of the second air is within a control condition area of a psychrometric chart. Determining, by the control apparatus, whether the state of the first air is within a designated zone of the psychrometric chart. Operating the air handling system based on the determinations by the control apparatus that the state of the second air is not within the control condition area of the psychrometric chart and the state of the first is within the designated zone of the psychrometric chart.

The control condition area may be defined by the state of second air that is equal to or greater than a first temperature, equal to or less than a second temperature, and equal to or less than a reference dew point. Determining whether the state of the first air is within the designated zone of the psychrometric chart may further include determining whether the state of the first air corresponds to at least one of the following zones. A first zone that is less than a third temperature of the psychrometric chart and the third temperature is less than the first temperature. A second zone that is equal to or greater than the third temperature and equal to and less than the first temperature. A third zone that is equal to or greater than the first temperature, equal to and less than the second temperature, and equal to and less than a first humidity. A fourth zone that is equal to or greater than the first temperature, equal to and less than the second temperature, greater than a second humidity, and equal to and less than the reference dew point. A fifth zone that is greater than the reference dew point, equal to and less than a heat exchange efficiency line of the psychrometric chart which indicates an efficiency of heat exchange between the first air and the second air of a heat exchange part of the air handling system. A sixth zone that is greater than the second temperature, equal to and less than the reference dew point and equal to and less than the heat exchange efficiency line of the psychrometric chart. A seventh zone matching the control condition area. An eighth zone that is outside from the control condition area and is greater than the heat exchange efficiency line.

Operating the air handling system may further include operating the air handling system in a first control mode based on a determination that the state of the first air corresponds to the first zone. The operating of the air handling system in the first control mode includes circulating the first air through a first heat exchange path of the heat exchange part and circulating the second air through a second heat exchange path of the heat exchange part such that second air exchanges heat with the first air within the heat exchange part.

Operating the air handling system may further include operating the air handling system in a second control mode based on a determination that the state of the first air corresponds to at least one of the second zone, the third zone, the fourth zone, the fifth zone, the sixth zone, and the seventh zone. The operating of the air handling system in the second control mode includes circulating the first air through the first heat exchange path of the heat exchange part, circulating the second air through the second heat exchange path of the heat exchange part such that second air exchanges heat with the first air within the heat exchange part, and injecting liquid into the heat exchange part to cool the first air.

Operating the air handling system may further include operating the air handling system in a third control mode based on a determination that the state of the first air corresponds to the seventh zone. The operating of the air handling system in the third control mode may include exchanging the second air within the target space with the first air.

Operating the air handling system may further include operating the air handling system in a fourth control mode based on a determination that the state of the first air corresponds to an eighth. The operating of the air handling system in the fourth control mode may include circulating the first air through the first heat exchange path of the heat exchange part, circulating the second air through the second heat exchange path of the heat exchange part such that second air exchanges heat with the first air within the heat exchange part, injecting liquid into the heat exchange part to cool the first air, and directly adjusting the second air.

Circulating the first air through the first heat exchange path during at least one of the first, second, and third control modes may include circulating the first air by natural convection or by forced air. Circulating the second air through the second heat exchange path during at least one of the first, second, and third control modes may include circulating the second air by natural convection or by forced air.

The first temperature may be a range of 17 degrees Celsius to 19 degrees Celsius, the second temperature may be a range of 26 degrees Celsius to 28 degrees Celsius, the third temperature may be a range of 14 degrees Celsius to 16 degrees Celsius, the first humidity may be a range of 19% to 21%, the second humidity may be a range of 79% to 81%, and the reference dew point may be a range of 20 degrees Celsius to 22 degrees Celsius.

Thus, an air handling system and an air handling method using the system according to an embodiment of the present invention, the air handling for the target space is performed with at least energy consumption by controlling at least one of the circulation of the first air, the circulation of the second air, the liquid injection for vaporization within the heat exchange part, the circulation of air exchange of the first air and the second air within the target space, and the direct adjustment which directly cools or heats the second air by using the state of the first air detected by the first sensor and the state of the second sensor. In other words, the air handling for the target space is performed with a low energy since the control apparatus applies other methods beside the direct adjustment method of the second air in which energy consumption is high according to the state of the first air and the second air.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 12 is a table showing an exemplary time ratio according to the climate classifications of various zones.

DETAILED DESCRIPTION OF THE ILLUSTRATED EMBODIMENTS

Figure 1:
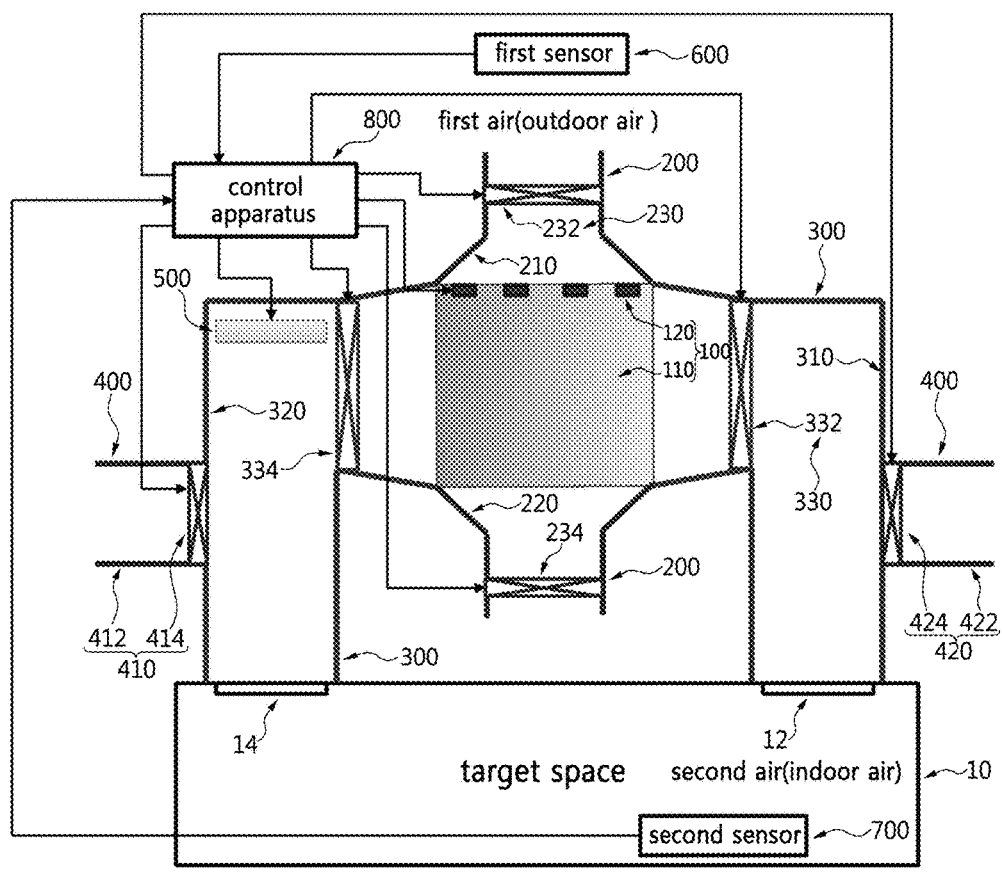
FIG. 1 is a schematic diagram illustrating an air handling system according to an exemplary embodiment

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and apparatus are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element or layer, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

"Air handling" means processing temperature, humidity, cleanness, and/or flow distribution of the air to match the environmental parameter requirements of an enclosed space. A system for processing such air handling or conditioning is called an "air handling system." In other words, in factories, warehouses, laboratories, server rooms (i.e., rooms where large-scale servers are situated), or other places housing sensitive products or equipment, the installation and operation of an air handling system is essential in order to maintain the adequate function of the equipment or prevent degradation of sensitive products.

An air handling system may include a heat source equipment, an air conditioning equipment, a heat transfer equipment, and an automatic control equipment. The air handling system may include a refrigerating machine, a boiler, a coolant pump, a water supply equipment, and piping. The heat source equipment may processes the heat load of the entire air handling system. The air conditioning equipment may cool, heat, or remove particles of air that enters the target space. The air conditioning equipment may also remove moisture (i.e., reducing humidity) or add moisture (i.e., increasing humidity) to air that enters the target space. Thus, the air conditioning equipment may include an air cooler, a dehumidifier, a heater, an air filter, a humidifier, and a blower. The heat transfer equipment may transfer and circulate air between the heat source equipment and the air conditioning equipment, circulate air between the air conditioning equipment and the target space, and regulate the intake of outdoor air into the target space. The automatic control equipment may control the heat source equipment, the air conditioning equipment, and the heat transfer equipment such that the required air handling condition is satisfied within a certain space.

However, the air handling system may require large amounts of energy to process air for the target space in order to satisfy the required or optimum climate conditions for equipment (e.g., servers) located in the target space. Energy consumption may be particularly high during extremely hot and humid days when the equipment in the target space requires energy intensive cooling and dehumidifying processes by the air handling system. Accordingly, exemplary devices and methods that require minimal energy consumption for maintaining equipment or products at required climate conditions are described below.

Figure 2:
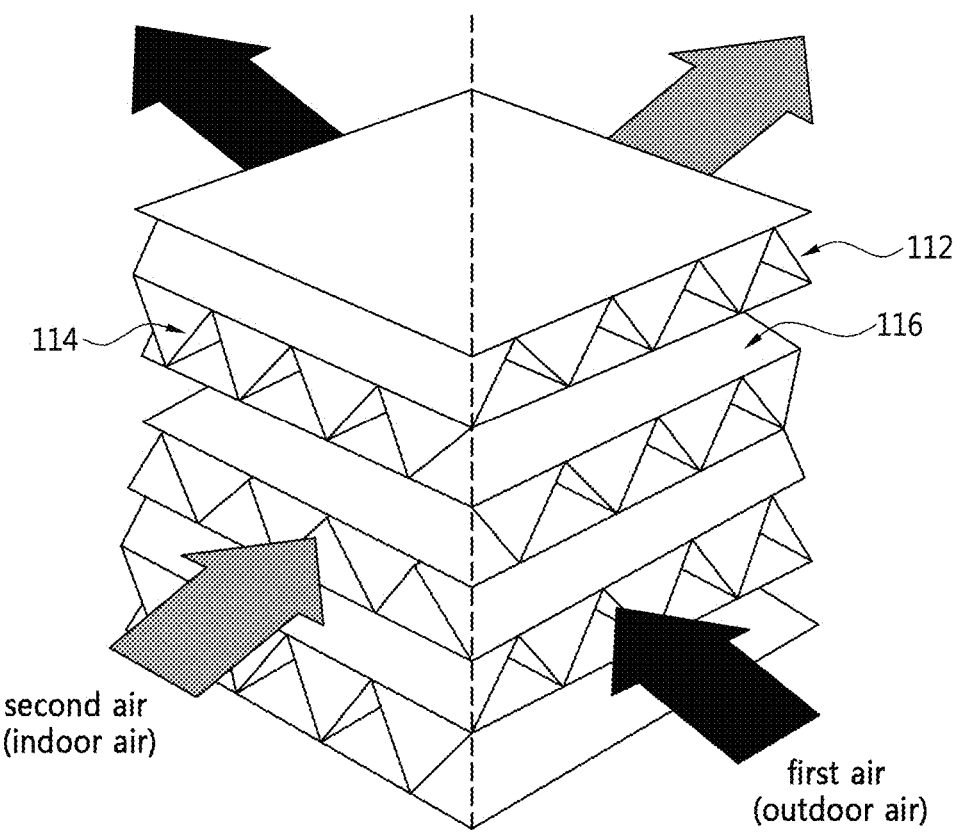
FIG. 2 is a perspective view which shows an example of an indirect heat exchanger of the air handling system of FIG. 1.

FIG. 1 is a conceptual diagram illustrating an air handling system according to an exemplary embodiment. FIG. 2 is a perspective view that shows an example of an indirect heat exchanger of the air handling system of FIG. 1.

Referring to FIGS. 1 and 2, an air handling system according to an exemplary embodiment may process air for a target space. The air handling system may include an indirect heat exchanger 100, a first circulation equipment 200, a second circulation equipment 300, a third circulation equipment 400, a direct adjusting apparatus 500, a first sensor 600, a second sensor 700, and a control apparatus 800. Herein, the target space 10 may be an enclosed space that may accommodate a large-scale server. For example, the target space 10 may be a separate room in an office building, warehouse, or even a space enclosed by a flexible enclosures such as tented structure.

The indirect heat exchanger 100 may exchange heat between a first air originating outside the target space 10 (e.g., outdoor air or air from another room) and a second air originating within the target space 10. The indirect heat exchanger 100 may include a heat exchange part 110 and a vaporization part 120. Herein, the first air may be outdoor air.

The heat exchange part 110 may include a first heat exchange path 112 through which the first air is passed, and a second heat exchange path 114 through which the second air is passed. The first and second heat exchange paths 112 and 114 may be disposed adjacent to each other so that heat is evenly exchanged. For example, as shown in FIG. 2, a layer having a plurality of first heat exchange paths 112 may be disposed in over a layer of a plurality of second heat exchange paths 114 according to an exemplary embodiment. For example, the plurality of first heat exchange paths 112 are disposed in a plurality of first layers that alternate vertically with a plurality of second layers having the plurality of second heat exchange paths 114. In addition, the plurality of first heat exchange paths 112 of each of the plurality of first layers may have horizontal paths that intersect with the plurality of second heat exchange paths 114 of the plurality of second layers.

The heat exchange part 110 may include a heat transfer medium 116 that is disposed between the plurality of the first heat exchange paths 112 and the plurality of second heat exchange paths 114 to transfer heat between the plurality of the first heat exchange paths 112 and the plurality of the second heat exchange paths 114. The heat transfer medium 116 may be formed by a material (e.g., stainless steel) through which heat exchange of air may be transferred effectively.

The control apparatus 800 may control the vaporization part 120. The vaporization part 120 may inject liquid into the heat exchange part 110. For example, the vaporization part 120 may inject liquid on a surface of the heat transfer medium 116, which faces the plurality of first heat exchange paths 112. Thus, a temperature of the heat transfer medium 116 may be lowered by the vaporization when the vaporization part 120 injects liquid on the surface of the heat transfer medium 116. Also, control apparatus 800 may adjust the amount of the liquid vaporization part 120 injects on the surface of the heat transfer medium 116 to precisely control the temperature of the heat transfer medium 116.

The first circulation equipment 200 may be connected to the plurality of first heat exchange paths 112 such that the first air is circulated through the plurality of first heat exchange paths 112. For example, the first circulation equipment 200 may include a first intake path part 210, a first outlet path part 220, and a first circulation control part 230.

The first intake path part 210 may be connected to an entrance of the plurality of first heat exchange paths 112 such that the first air may flow through the plurality of first heat exchange paths 112.

The first outlet path part 220 may be connected to the plurality of first heat exchange paths 112 such that the first air emits from the plurality of first heat exchange paths 112.

The first circulation control part 230 may be disposed on at least one of the first intake path part 210 or the first outlet path part 220. The control apparatus 800 may control the first circulation control part 230. The first circulation control part 230 may control the circulation of the first air within the first heat exchange path 112 based on instructions from the control apparatus 800. In other words, the first circulation control part 230 may include at least one of a first intake control part 232 disposed in the first intake path part 210 and a first outlet control part 234 disposed in the first outlet path part 220. Herein, each of the first intake control part 232 and the first outlet control part 234 may include a circulation fan, which is controlled by the control apparatus 800, to circulate the first air.

According to an exemplary embodiment, the control apparatus 800 controls the first circulation control part 230. The first circulation control part 230 may be set to a closed mode where intake and outlet of the first air through the plurality of first heat exchange paths 112 are blocked. The first circulation control part 230 may be set to an open mode where natural convectional circulation of the first air to the plurality of first heat exchange paths 112 occurs. Moreover, the first circulation control part 230 may be set to a forced mode where forced circulation of the first air through the plurality of first heat exchange paths 112 occurs. Herein, in case of the forced mode, the first circulation control part 230 may control an amount of the first air which is circulated through the plurality of first heat exchange paths 112. For example, the first circulation control part 230 may control the amount of the first air which is circulated through the plurality of first heat exchange paths 112 by adjusting rotational speed of the circulation fan.

The second circulation equipment 300 may connect the target space 10 to plurality of the second heat exchange paths 114 such that the second air is circulated through the plurality of the second heat exchange paths 114. For example, the second circulation equipment 300 may include a second intake path part 310, a second outlet path part 320, and a second circulation control part 330.

The second intake path part 310 may connect an outlet 12 of the target space 10 to the plurality of second heat exchange paths 114 such that the second air of the target space 10 may flow through the plurality of second heat exchange paths 114. The second outlet path part 320 may connect an outlet part of the plurality of second heat exchange path 114 to an intake part 14 of the target space 10 such that the second air that discharges from the second heat exchange path 114 and returns to the target space 10.

The second circulation control part 330 may be disposed in at least one of the second intake path part 310 and the second outlet path part 320. The control apparatus 800 may control the second circulation control part 330. The second circulation control part 330 may control the second air of the plurality of the second heat exchange paths 114. In other words, the second circulation control part 330 may include at least one of a second intake control part 332 disposed in the second intake path part 310 and a second outlet control part 334 disposed in the second outlet path part 320. Herein, each of the second intake control part 332 and the second outlet control part 334 may include a circulation fan, which is controlled by the control apparatus 800, and may circulate the second air.

According to an exemplary embodiment, the control apparatus 800 may control the second circulation control part 330. The second circulation control part 330 may be set to a closed mode where intake and outlet of the second air through the plurality of the second heat exchange paths 114 are blocked. The second circulation control part 330 may be set to an open mode where natural convectional circulation of the second air through the plurality of the second heat exchange paths 114 occurs. Moreover, the second circulation control part 330 may be set to a forced mode where forced circulation of the second air through the plurality of the second heat exchange paths 114 occurs. Herein, in case of the forced mode, the second circulation control part 330 may control an amount of the second air which is circulated through the plurality of the second heat exchange paths 114. For example, the second circulation control part 330 may control the amount of the second air which is circulated through the plurality of the second heat exchange paths 114 by adjusting the rotational speed of the circulation fan.

The third circulation equipment 400 may perform an air exchange circulation which means discharging the second air from the target space 10 while providing the first air into the target space 10. For example, third circulation equipment 400 may include an air intake part 410 and an air outlet part 420. The air intake part 410 supplies the first air to the target space 10 and the air outlet part 420 discharges the second air from the target space 10.

The air intake part 410 may include an intake path 412 and an intake control unit 414. The intake path 412 may be connected to the target space 10 or the second circulation equipment 300. For example, the intake path 412 may be connected to the second outlet path part 320 of the second circulation equipment 300 as shown in FIG. 1. The intake control unit 414 may be disposed in the intake path 412 and the control apparatus 800 may control the intake control unit

414. The intake control unit 414 may control the intake of the first air into the target space 10. For example, the intake control unit 414 may include a circulation fan, which may be controlled by the control apparatus 800, and may circulate the second air.

According to an exemplary embodiment, the intake control unit 414 may be controlled by the control apparatus 800. The intake control unit 414 may be set to a closed mode where intake of the first air into the target space 10 is blocked. The intake control unit 414 may be set to an open mode where natural convectional circulation of the first air through the intake path 412 occurs. Moreover, the intake control unit 414 may be set to a forced mode where forced circulation of the first air through the intake path 412 occurs. Herein, in the forced mode, when the intake control unit 414 may control the amount of intake of the first air into the target space 10 through the intake path 412. For example, the intake control unit 414 may control the intake amount of the first air into the target space 10 by adjusting the rotational speed of the circulation fan.

The air outlet part 420 may include an outlet path 422 and an outlet control unit 424. The outlet path 422 may be connected to the target space 10 or the second circulation equipment 300. For example, the outlet path 422 may be connected to the second intake path part 310 of the second circulation equipment 300 as shown in FIG. 1. The outlet control unit 424 may be disposed in the outlet path 422 and the control apparatus 800 may control the outlet control unit 424, which may control the outlet of the second air from the target space 10. For example, the outlet control unit 424 may include a circulation fan, which may be controlled by the control apparatus 800, and may discharge the second air.

According to an exemplary embodiment, the control apparatus 800 may control the outlet control unit 4240. The outlet control unit 424 may be set to a close mode where the outlet of the second air from the target space 10 is blocked. The outlet control unit 424 may be set to an open mode where natural convectional circulation of the second air through the outlet path 422 occurs. Moreover, the outlet control unit 424 may be set to a forced mode where forced circulation of the second air through the outlet path 422 occurs. Herein, in a forced mode, the outlet control unit 424 may control an amount of the second air that discharges from the target space 10 through the outlet path 422. For example, the outlet control unit 424 may control the amount of the second air which is discharged from the target space 10 by adjusting the rotational speed of the circulation fan.

The direct adjusting apparatus 500 may be disposed in the target space 10 or the second circulation equipment 300. The control apparatus 800 may control the direct adjusting apparatus 500. The direct adjusting apparatus 500 may directly adjust the cooling or heating the second air. For example, the direct adjusting apparatus 500 may be disposed in the second outlet path part 320 as shown in FIG. 1. Also, the direct adjusting apparatus 500 may include an air conditioner, which is controlled by control apparatus 800, to cool the second air. The direct adjusting apparatus 500 may also include a heater, which is controlled by the control apparatus 800, to heat the first air, the recirculated second air, or some combination of the first and second air.

The first sensor 600 may be disposed in location where the first air is present and may detect a state of the first air and provide it to the control apparatus 800. For example, the first sensor 600 may be disposed outside of the target space (e.g., outdoors). Herein, the state of the first air may include temperature, humidity, and dew point of the first air.

The second sensor 700 may be disposed within the target space 10, detect a state of the second air, and provide information on the state of the second air to the control apparatus 800. Herein, the state of the second air may include temperature, humidity, and dew point of the second air.

The control apparatus 800 may receive the state of the first air from the first sensor 600 in real time or periodically (e.g., hourly or every minute), and receive the state of the second air from the second sensor 700 in real time or periodically. Also, the control apparatus 800 may control at least one of a first air circulation within the first circulation equipment 200, a second air circulation within the second circulation equipment 300, a liquid injection in the vaporization part 120, an air circulation with the third circulation equipment 400, and a direct adjustment of the direct adjusting apparatus 500 by using the state of the first air detected by the first sensor 600 and the state of the second air detected by the second sensor 700.

Hereinafter, a control method by the control apparatus 800 will be further described below with reference to FIGS. 1-12.

Figure 3:
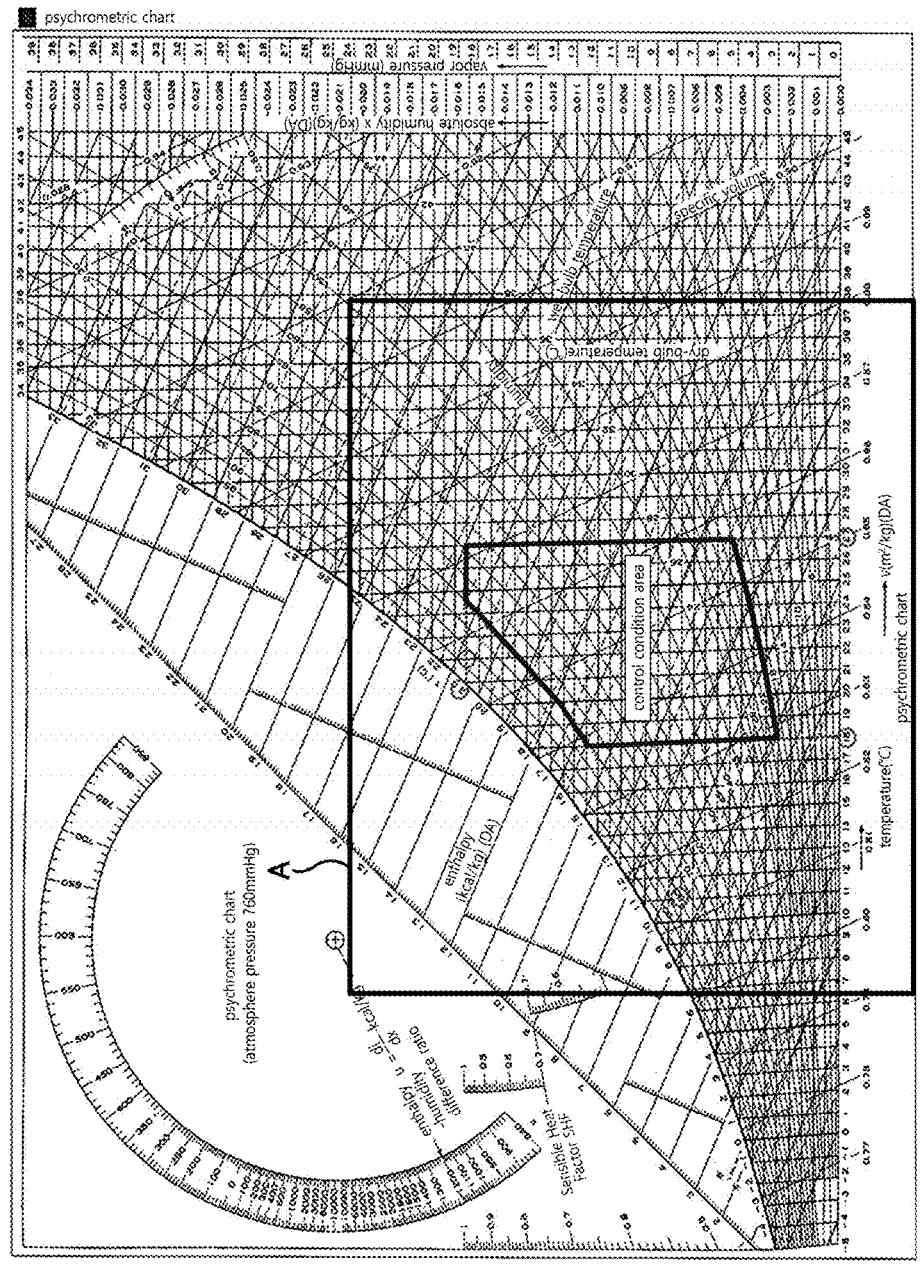
FIG. 3 is a psychrometric chart illustrating a control condition area for the air handling in a target space.
Figure 4:
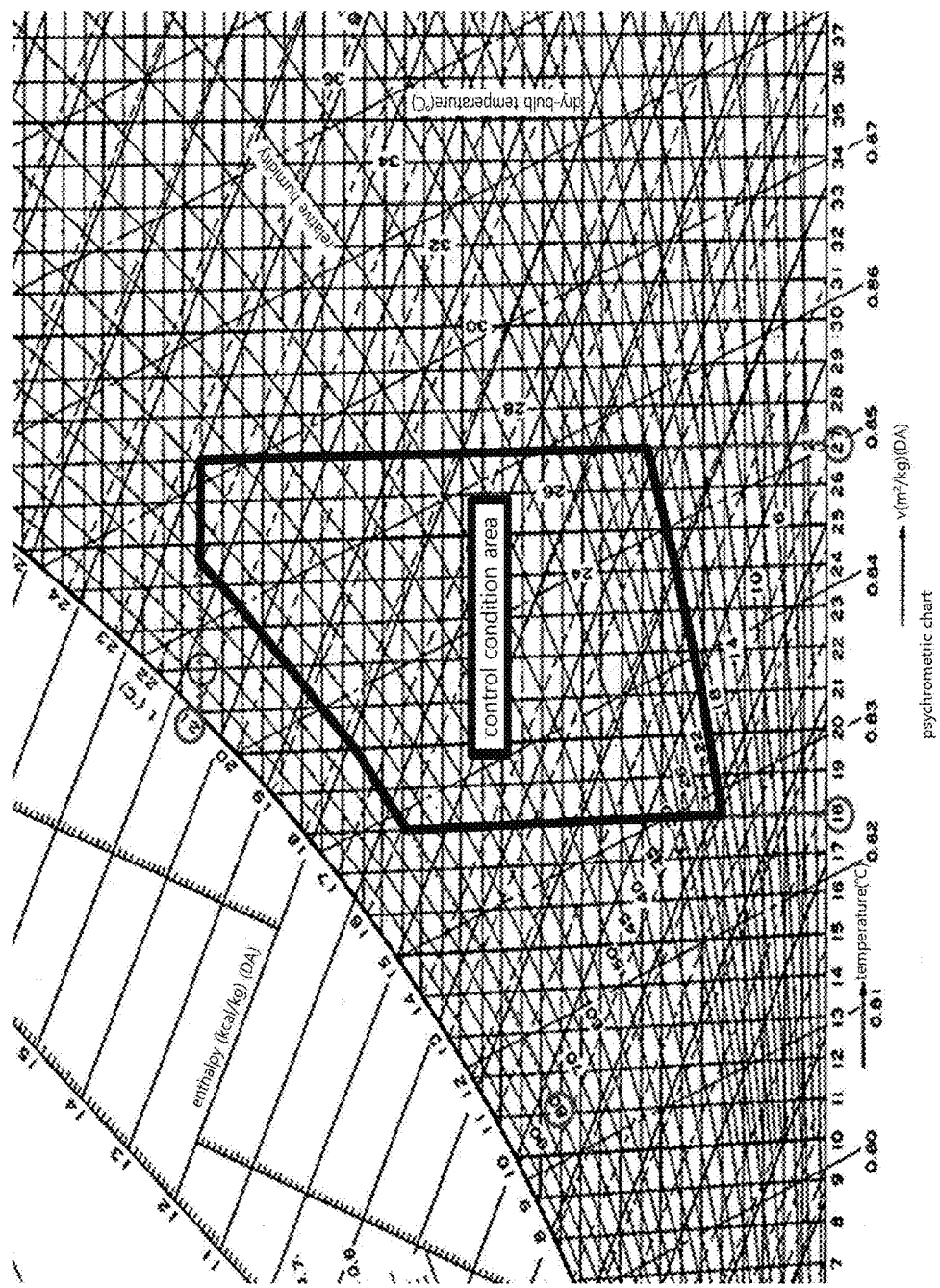
FIG. 4 is an enlarged view of part A of the psychrometric chart of FIG. 3.

FIG. 3 is a psychrometric chart illustrating a control condition area for the air handling in a target space. FIG. 4 is an enlarged view of part A of the psychrometric chart of FIG. 3.

Referring to FIGS. 1, 3, and 4, the control apparatus 800 may control at least one of the first air circulation within the first circulation equipment 200, the second air circulation within the second circulation equipment 300, the liquid injection in the vaporization part 120, the air circulation within the third circulation equipment 400, and the direct adjustment of the direct adjusting apparatus 500 such that the state of the second air within the target space 10 may be maintained within the control condition area of a psychrometric chart.

When the control apparatus 800 determines that the state of the second air detected by the second sensor 700 remains in the control condition area, the control apparatus 800 may shut down the circulation of the second air within the second circulation equipment 300 and the air exchange within the third circulation equipment 400 such that the second air within the target space 10 remains static. In other words, the second air within the target space 10 stays within the target space 10.

However, when the control apparatus 800 determines that the state of the second air detected by the second sensor 700 has been, is, or is predicted to be (i.e., estimated or forecasted) out of the control condition area, the control apparatus 800 may control at least one of the first air circulation within the first circulation equipment 200, the second air circulation within the second circulation equipment 300, the liquid injection in the vaporization part 120, the air circulation within the third circulation equipment 400, and the direct adjustment of the direct adjusting apparatus 500 such that the state of the second air is maintained within the control condition area.

The control apparatus 800 may control various components of the air handling system to maintain or correct the second air to be within the control condition area of the psychrometric chart. In other words, the control apparatus 800 may adjust various components of the air handling system to maintain the state of the second air to be equal to or greater than a first temperature, equal to or less than a second temperature, equal to or greater than a first humidity, equal to or less than a second humidity, and equal to or less than a reference dew point.

The first temperature may be a range of about 17 degrees Celsius to about 19 degrees Celsius. The second temperature may be a range of about 26 degrees Celsius to about 28 degrees Celsius. The first humidity may be a range of about 19% to about 21%. The second humidity may be a range of about 79% to about 81%. The reference dew point may be a range of about 20 degrees Celsius to about 22 degrees Celsius. As shown by the circled numbers in FIG. 4, the first temperature may be 18 degrees Celsius, the second temperature may be 27 degrees Celsius, the first humidity may be 20%, the second humidity may be 80%, and the reference dew point may be a 21 degrees Celsius.

Figure 5:
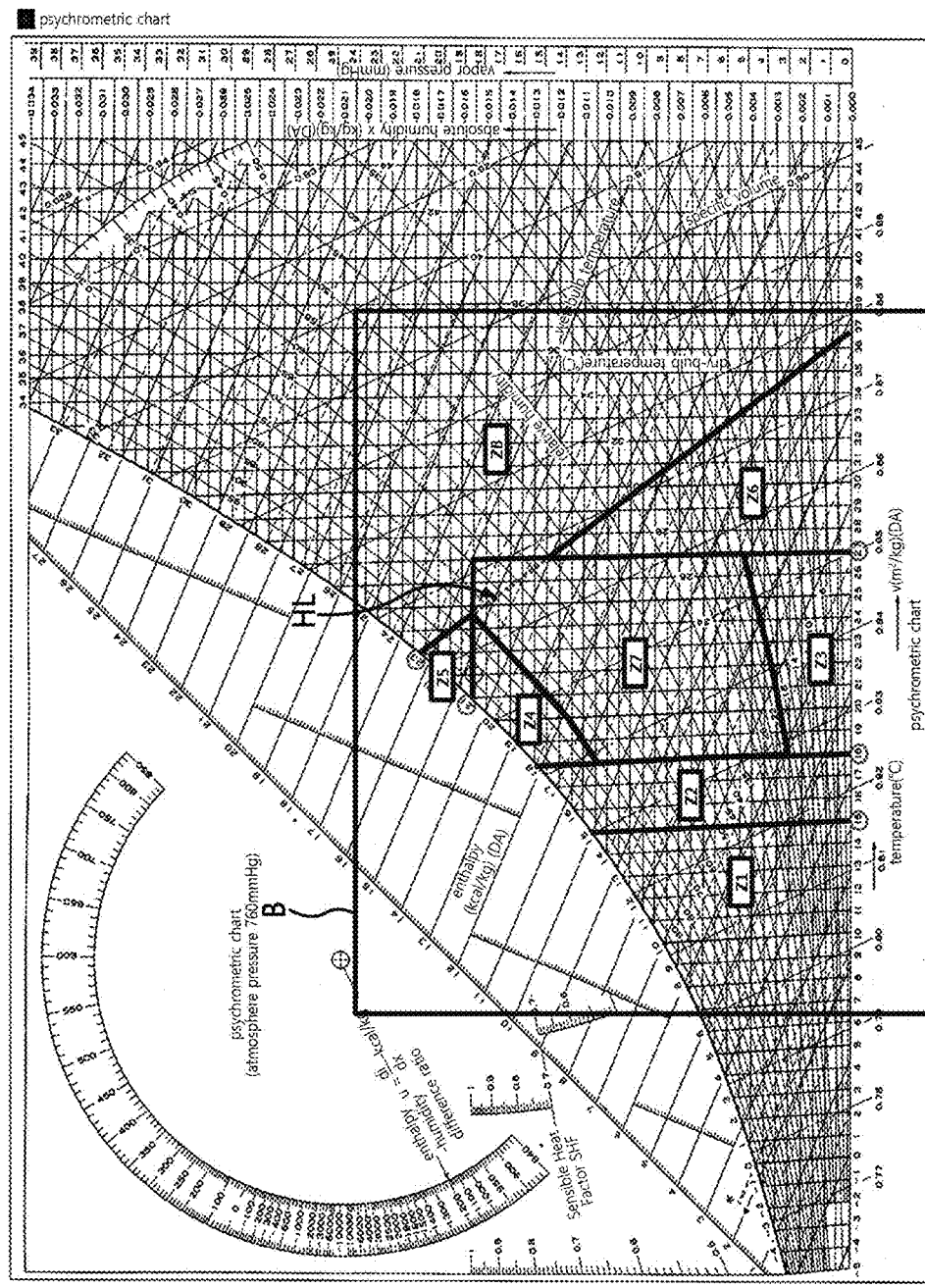
FIG. 5 is a psychrometric chart of humid air having a designated zone of a state of the first air.
Figure 6:
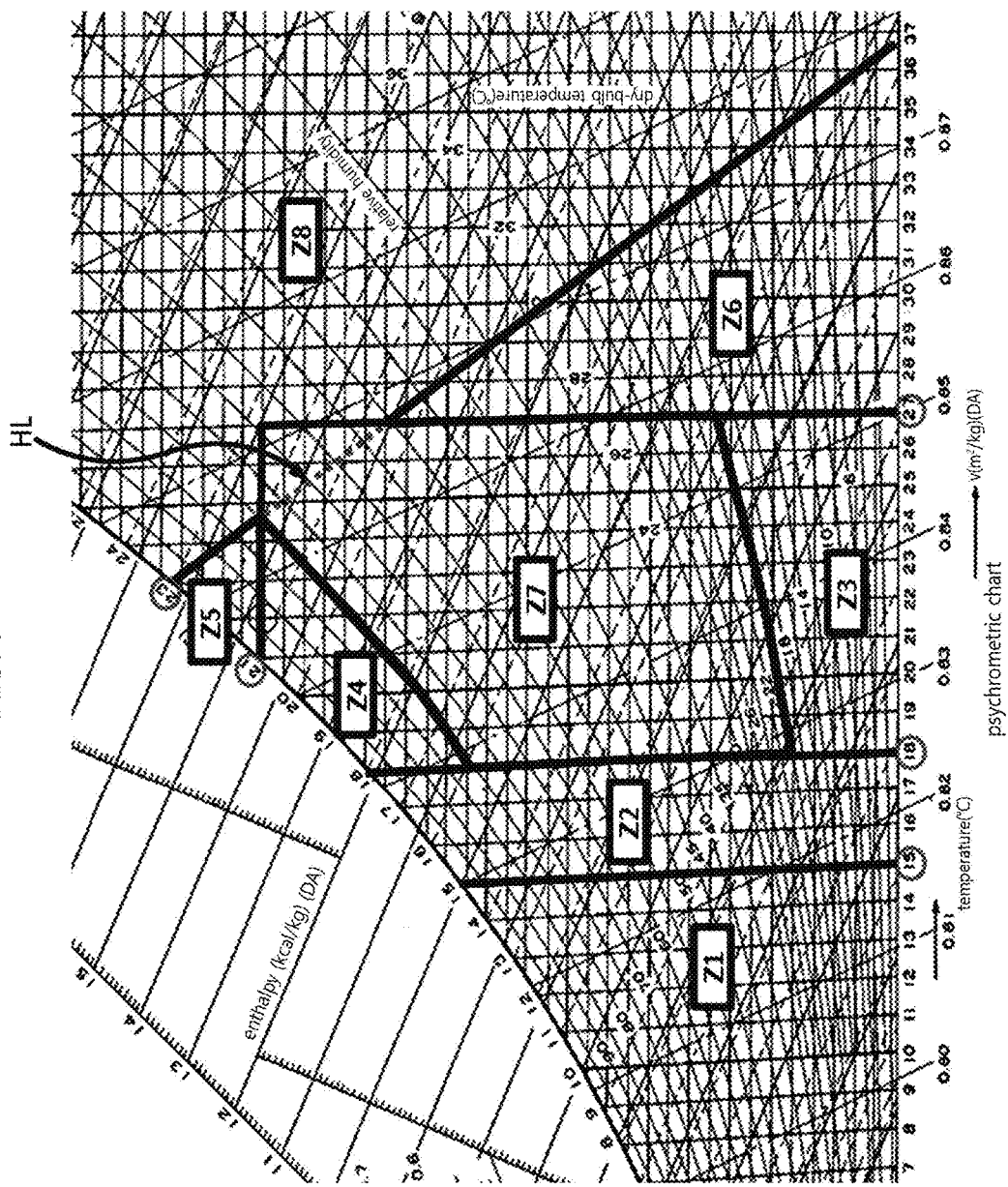
FIG. 6 is an enlarged view of part B part of the psychrometric chart of FIG. 5.

FIG. 5 is a psychrometric chart of humid air having a designated zone for a state of the first air. The designated zone may include a first, second, third, fourth, fifth, sixth, seventh, and eight zones that are distinguished according to the particular state of the first air. FIG. 6 is an enlarged view of part B of the psychrometric chart of the FIG. 6.

Referring to FIGS. 1, 5, and 6, the control apparatus 800 may apply different control methods for handling the air of the target space 10 according to the state of the first air detected by the first sensor 600. In other words, the control apparatus 800 may apply a different control method depending on which zone of the psychrometric chart the first air is detected in (e.g., first to eighth zones Z1 to Z8 of the psychrometric chart).

According to an exemplary embodiment, the first zone Z1 may be an area where the state of the first air is equal to or less than a third temperature. Herein, the third temperature may be a range between about 14 degrees Celsius to about 16 degrees. For example, the third temperature may be 15 degrees Celsius, as shown in FIG. 4. The second zone Z2 may be an area where the state of the first air is equal to or greater than the third temperature and equal to or less than the first temperature. The third zone Z3 may be an area where the state of the first air is equal to or greater than the first temperature, equal to or less than the second temperature, and less than the first humidity. The fourth zone Z4 may be an area where the state of the first air is equal to or greater than the first temperature, equal to or less than the second temperature, greater than the second humidity, and equal to or less than the reference dew point. The fifth zone Z5 may be an area where the state of the first air is greater than the reference dew point and equal to or less than a heat exchange efficiency line HL which indicates the efficiency of the heat exchange between the first and second airs of the heat exchange part 110. The sixth zone Z6 may be an area where the state of the first air is greater than the second temperature, equal to or less than the reference dew point, and equal to or less than a heat exchange efficiency line HL within the psychrometric chart. The seventh zone Z7 may be an area where the state of the first air is equal to the control condition area. The eighth zone Z8 may be an area where the first air state is out of the control condition area and greater than the heat exchange efficiency line HL.

The heat exchange efficiency line HL may be a virtual line which is defined according to an efficiency of temperature exchange between the first air and the second air and a heat exchange rate within the heat exchange part 110.

When T1 is defined as a temperature of the first air which is applied to the plurality of the first heat exchange path 112 of the heat exchange part 110, T2 may be defined as a temperature of the second air which is applied to the plurality of the second heat exchange paths 114 of the heat exchange part 110, T3 may be defined as a temperature of the second air which is discharged from the plurality of the second heat exchange paths 114, and the efficiency of a temperature exchange between the first air and the second air may be defined as $\{(T1-T3)/(T1-T2)\}*100$. The 100% efficiency value of the temperature exchange between the first air and the second air may be presented by a virtual line of set of points having a same enthalpy on the psychometric chart. Also, when the efficiency of the temperature exchange between the first air and the second air is equal to or less than 100%, a slope of the virtual line shown in the psychrometric chart may be presented as greater than a slope of the virtual line corresponding to 100% efficiency of the temperature exchange.

The heat exchange rate within the heat exchange part 110 may be a value which indicates a degree of heat transfer within the heat exchange part 110, a 100% value of the heat exchange rate may mean that heat is transferred without heat loss within the heat exchange part 110. In other words, assuming that the second air is cooled by the first air, the lower the heat exchange rate is within the heat exchange part 110, the lower temperature of the first air should be able to cool the second air to a predetermined temperature. Therefore, assuming that the second air is cooled by the first air, when the heat exchange rate within the heat exchange part (110) becomes lower, the virtual line determined by the efficiency of temperature exchange between the first air and the second air may be presented towards a left side of the psychometric chart.

As shown in FIG. 6, the heat exchange efficiency line HL may be a virtual line in which the efficiency of temperature exchange between the first air and the second air is 60% and the heat exchange rate within the heat exchange part 110 is 80%.

More specifically, assuming that the second air is cooled by the first air to the second temperature, e.g., 27 degrees Celsius, through the heat exchange part 110 with a 100% heat exchange rate, a 60% efficiency rate of temperature exchange between the first air and the second air means that the temperature of the first air applied to the first heat exchange path 112 should be equal to or less than 25 degrees Celsius to obtain the second air discharged from the second heat exchange path 114 of at least 27 degrees Celsius. Therefore, when an 80% heat exchange rate is utilized with the above 60% efficiency rate of temperature exchange between the first air and the second air, the temperature of the first air may be 23 degrees Celsius as opposed to 25 degrees Celsius.

Thus, the control apparatus 800 may receive the state of the first air detected by the first sensor 600, determine the zone (e.g., one of zones Z1 to Z8) that corresponds to the detected state of the first air, and apply one of a plurality of the control methods according to the determination.

Figure 7:
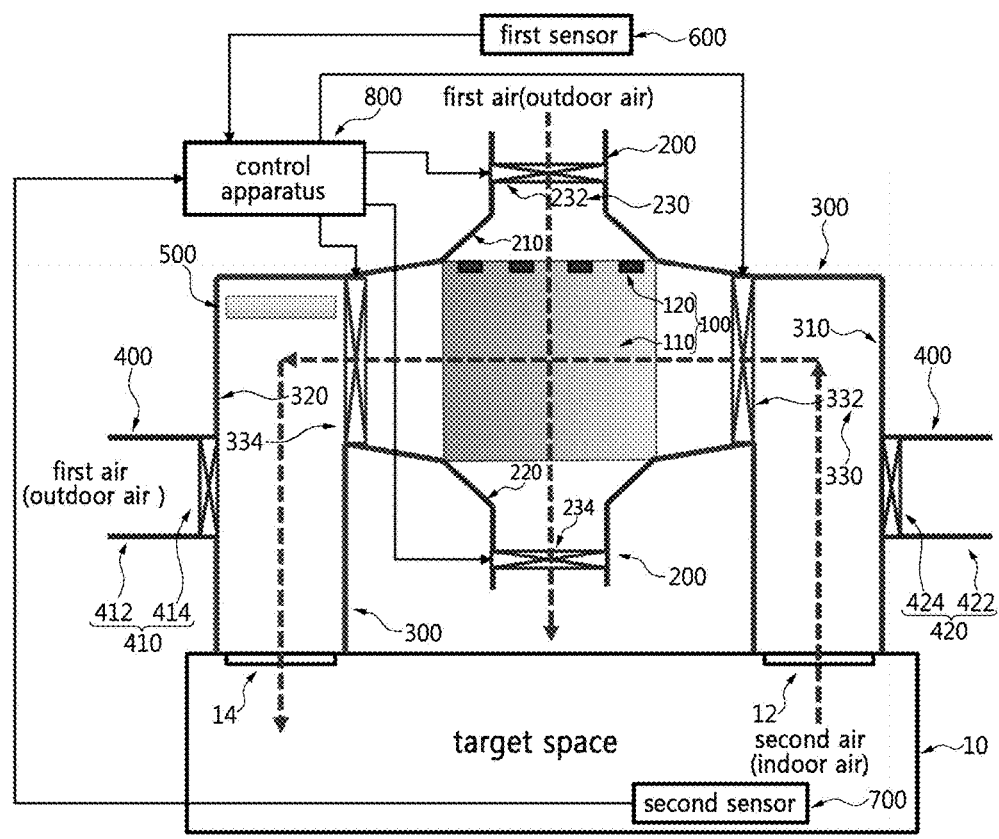
FIG. 7 illustrates an air handling system configured to operate according to a first control method.

FIG. 7 illustrates an air handling system configured to operate according to a first control method.

Referring to FIGS. 6 and 7, when the control apparatus 800 determines that the state of the first air detected by the first sensor 600 is within the first zone Z1, the control apparatus 800 may apply a first control method controlling circulation of the first air within the first circulation equipment 200 and circulation of the second air within the second circulation equipment 300 such that heat exchange is performed between the first air and the second air within the heat exchange part 110.

More specifically, when the control apparatus 800 determines that the state of the second air detected by the second sensor 700 is or is predicted to be out of the control condition area, and that the state of the first air detected by the first sensor 600 is within the first area Z1, then the control apparatus 800 may operate under the first control method such that heat exchange is performed between the first air and the second air within the heat exchange part 110.

The control apparatus 800, according to the first control method, may control the first circulation control part 230 to circulate the first air through the plurality of the first heat exchange paths 112 and the second circulation control part 330 to circulate the second air through the plurality of the second heat exchange paths 114. Herein, each of the circulation of the first air within the first circulation equipment 200 and the circulation of the second air within the second circulation equipment 300 may include at least one of circulation by natural convection (e.g., at least one of the first circulation control part 230 set to open mode and the second circulation control part 330 set to open mode) and circulation by forced air (e.g., at least one of the first circulation control part 230 set to forced mode and the second circulation control part 330 set to forced mode).

The control apparatus 800 may control at least one of the first intake control part 232 and the first outlet control part 234, in the same or different way, to circulate the first air. The control apparatus 800 may also control at least one of the second intake control part 332 and the second outlet control part 334, in the same or different way, to circulate the second air.

The control apparatus 800 may also control the vaporization part 120 such that the vaporization part 120 is not operated, control the direct adjusting apparatus 500 such that the direct adjusting apparatus 500 is not operated, control the intake control unit 414 in the closed mode such that the first air does not flow into the target space 10 through the intake path 412, and control the outlet control unit 424 in the closed mode such that the second air is not discharged from the target space 10 through the outlet path 422.

Heat exchange may be performed between the first air and the second air within the heat exchange part 110 when the control apparatus 800 is controlled by the first control method. The second air within the target space 10 may be cooled by exchanging heat with the first air in the first zone Z1.

The first zone Z1 may be divided into an extremely low temperature area where the state of the first air is less than a fourth temperature which is lower than the third temperature and a medium-low temperature area where the state of the first air is equal to or greater than the fourth temperature and equal to or less than the third temperature. For example, the fourth temperature may be a range of about −10 Degrees Celsius to about 15 degrees Celsius.

Therefore, although the control apparatus 800 is controlled according to the first control method, supercooling of the second air by the first air may be suppressed by reducing or stopping the circulation of the first air and the second air when the state of the first air detected by the first sensor 600 is present in the extremely low temperature area, rather than in the medium-low temperature area.

Figure 8:
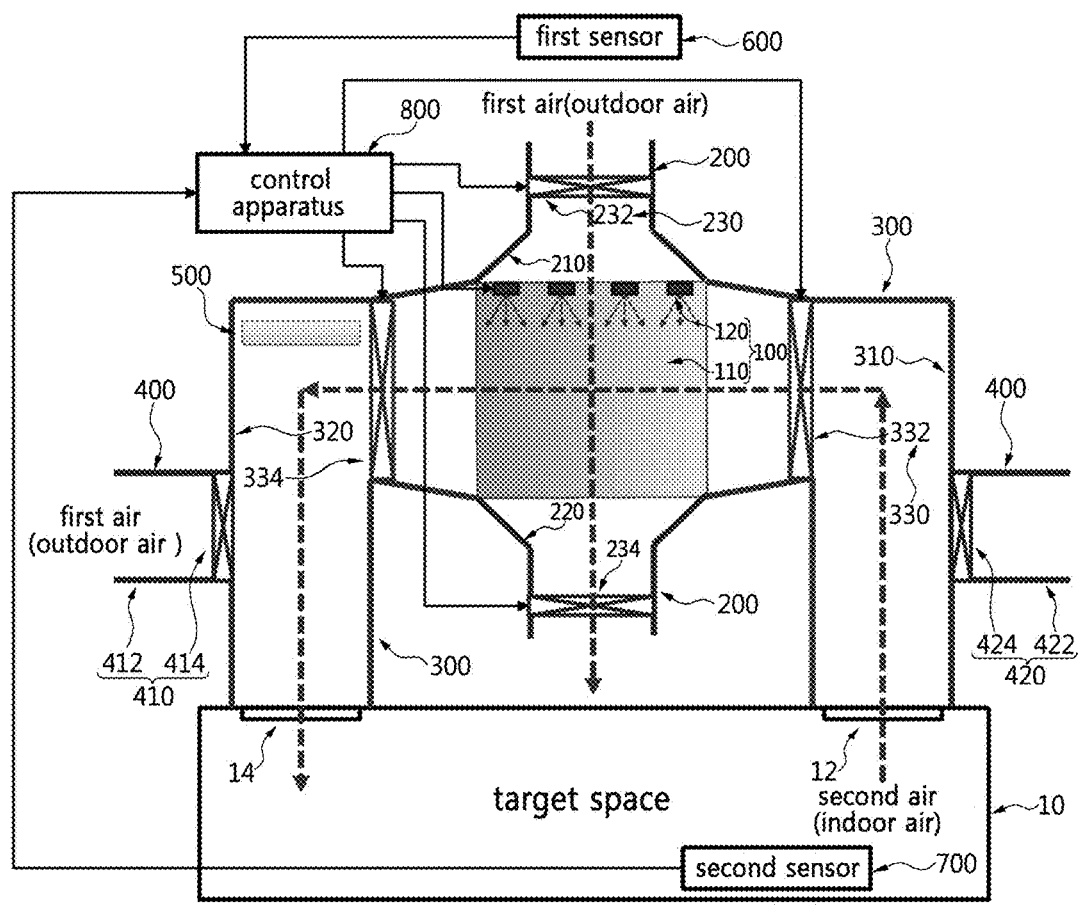
FIG. 8 illustrates an air handling system configured to operate according to a second control method.

FIG. 8 illustrates an air handling system configured to operate according to a second control method.

Referring to FIGS. 6 and 8, when the control apparatus 800 determines that the state of the first air detected by the first sensor 600 is in one area of the second to sixth zones Z2 to Z6, then, the control apparatus 800 may apply a second control method controlling the liquid injection of the vaporization part 120 in addition to the operations of the first control method described above.

In detail, when the control apparatus 800 determines that the state of the second air detected by the second sensor 700 is or is predicted to be out of the control condition area, and that the state of the first air detected by the first sensor 600 is within the second to sixth zones Z2 to Z6, then the control apparatus 800 may be operated under the second control method such that heat exchange between the first air and the second air is performed within the heat exchange part 110 and the first air is cooled by vaporization.

The control apparatus 800, according to the second control method, may control the first circulation control part 230 to circulate the first air through the first heat exchange path 112, control the second circulation control part 330 to circulate the second air through the second heat exchange path 114, and control the vaporization part 120 to inject liquid on the surface of the heat transfer medium 116 of the indirect heat exchanger 100.

The control apparatus 800 may also control the direct adjusting apparatus 500 such that the direct adjusting apparatus 500 is not operated, control the intake control unit 414 in a closed mode such that the first air is not flowed into the target space 10 through the intake path 412, and control the outlet control unit 424 in a closed mode such that the second air is not discharged from the target space 10 through the outlet path 422.

Heat exchange between the first air and the second air may be performed within the heat exchange part 110 with the first air that is cooled by vaporizing the liquid injected by the vaporization part 120 when the control apparatus 800 is operated under the second control method. As a result, the second air within the target space 10 may be cooled by exchanging heat with the first air cooled by the vaporization.

Figure 9:
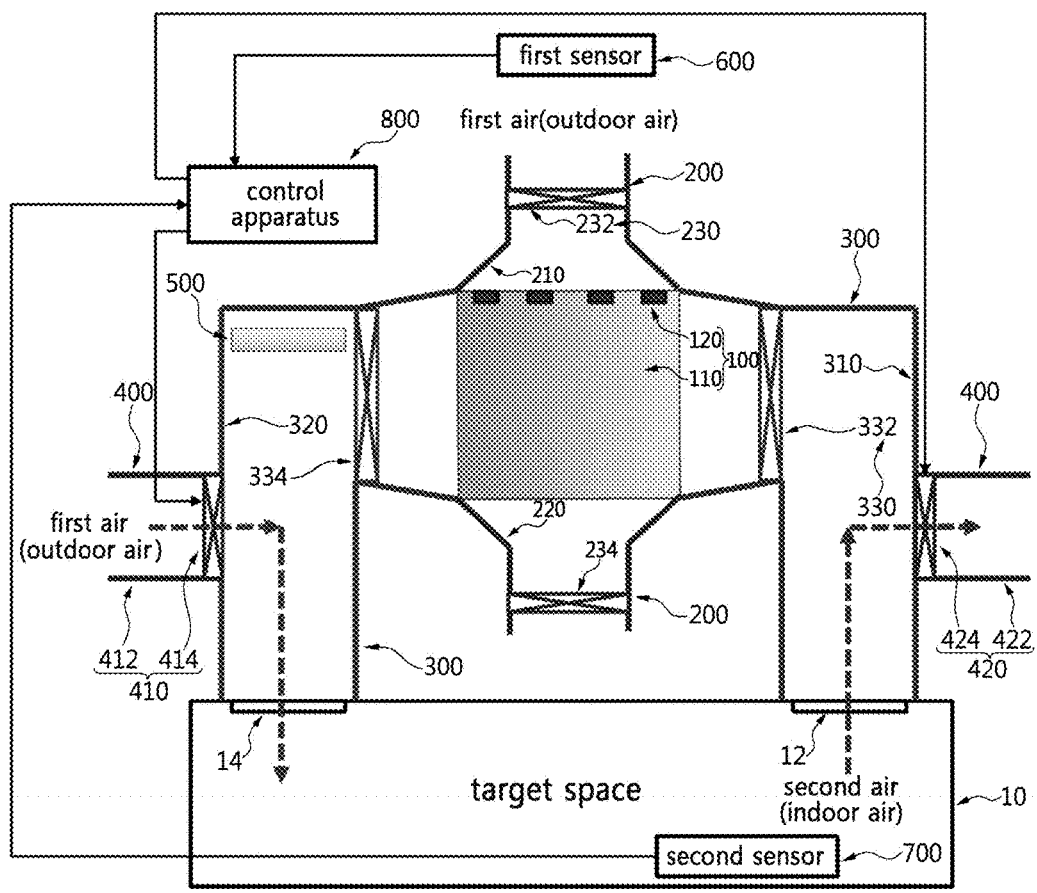
FIG. 9 illustrates an air handling system configured to operate according to a third control method.

FIG. 9 illustrates an air handling system configured to operate according to a third control method.

Referring to FIG. 9, when the control apparatus 800 determines that the state of the first air detected by the first sensor 600 is within the seventh zone Z7, then the control apparatus 800 may be operate under a third method controlling the circulation of air transfer within the third circulation equipment 400.

In detail, when the control apparatus 800 determines that the state of the second air detected by the second sensor 700 is or is predicted to be out of the control condition area and that the state of the first air detected by the first sensor 600 is within the seventh zone Z7, then the control apparatus 800 may operate under the third control method by which the first air is controlled to flow directly into the target space 10 and the second air is discharged or purged from the target space 10 instead recirculating the second air.

The control apparatus 800, according to the third control method, may control the intake control unit 414 such that the first air flows into the target space 10 through the intake path 412 and controls the outlet control unit 424 such that the second air is discharged from the target space 10 through the outlet path 422. The intake of the first air into the target space 10 through the intake path 412 and the outlet of the second air from the target space 10 through the outlet path 422 may be accomplished by natural convection (e.g., at least one of the intake control unit 414 set to open mode and the outlet control unit 424 set to open mode) and circulation by forced air (e.g., at least one of the intake control unit 414 set to an forced mode and the outlet control unit 424 set to force mode).

The control apparatus 800 may also control the first circulation control part 230 in closed mode such that the intake of the first air into the first heat exchange path 122 is blocked, control the second circulation control part 330 in closed mode such that the intake of the second air into the second heat exchange path 114 is blocked, control the vaporization part 120 such that the vaporization part 120 does not operate, and control the direct adjusting apparatus 500 such that the direct adjusting apparatus 500 does not operate. The control apparatus 800 may also control each of the first circulation control part 230 and the second circulation control part 330 in open mode for natural convection or a forced mode for forced circulation.

Thus, the first air may flow directly into the target space 10 through the intake path 412 and the second air may discharge from the target space 10 through the outlet path 422 when the control apparatus is operated under the third control method. As a result, the target space 10 may be replaced with the first air, which is within the control condition area.

Figure 10:
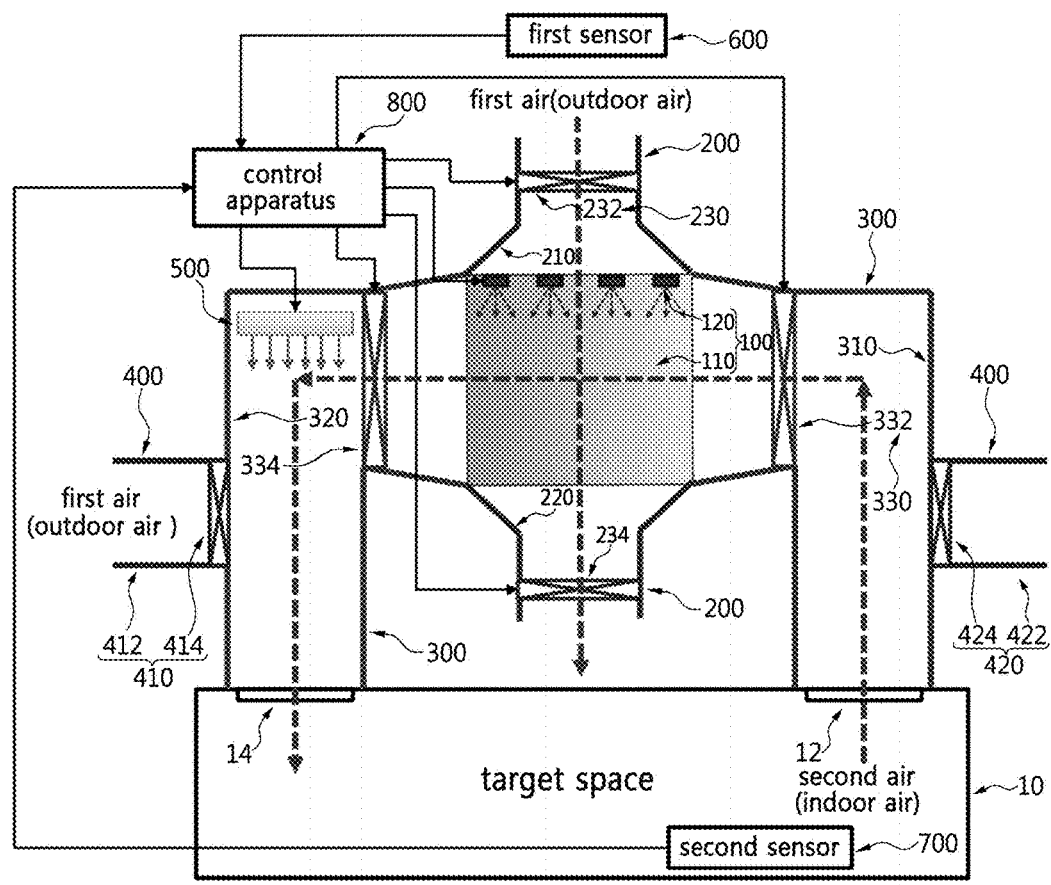
FIG. 10 illustrates an air handling system configured to operate according to a fourth control method.

FIG. 10 illustrates an air handling system configured to operate according to a fourth control method.

Referring to FIG. 10, when the control apparatus 800 determines that the state of the first air is within the eighth zone Z8, then the control apparatus 800 may operate by the fourth method controlling the direct adjusting apparatus 500 in addition to the operations of the second control method described above.

In detail, when the control apparatus 800 determines that the state of the second air detected by the second sensor 700 is or predicted to be out of the control condition and that the state of the first air detected by the first sensor 600 is present in the eighth area Z8, then the control apparatus 800 may operate under the fourth control method such that heat exchange between the first air and the second air in the heat exchange part 110, a cooling of the first air by vaporization, and a direct adjustment of the second air are performed simultaneously.

The control apparatus 800, according to the fourth control method, may control the first circulation control part 230 to circulate the first air through the plurality of the first heat exchange paths 112, control the second circulation control part 330 to circulate the second air through the plurality of the second heat exchange paths 114, control the vaporization part 120 to inject liquid on the surface of the heat transfer medium 116 of the indirect heat exchanger 100, and control the direct adjusting apparatus 500 to perform a direct adjustment of cooling or heating the second air.

The control apparatus 800 may also control the intake control unit 414 to closed mode such that the first air does not flow directly into the target space 10 through the intake path 412, control the outlet control unit 424 to closed mode such that the second air does not discharge from the target space 10 through the outlet path 422.

Thus, cooling of the first air by the vaporization part 120, heat exchange between the first air and the second air by the heat exchange part 110, and direct adjustment of the second air by the direct adjusting apparatus 500 may be performed simultaneously. As a result, temperature of the second air within the target space 10 may be cooled since the second air is cooled through the heat exchange by the first air, which may be cooled by vaporization, and through directly adjusting the second air (e.g., removing humidity with a dehumidifier, adding humidity with a humidifier, adding heat with a furnace, or removing heat with an air conditioner) by the direct adjusting apparatus 500.

Hereinafter, a method for air handling the target space 10 using the above air handling system is described below.

Figure 11:
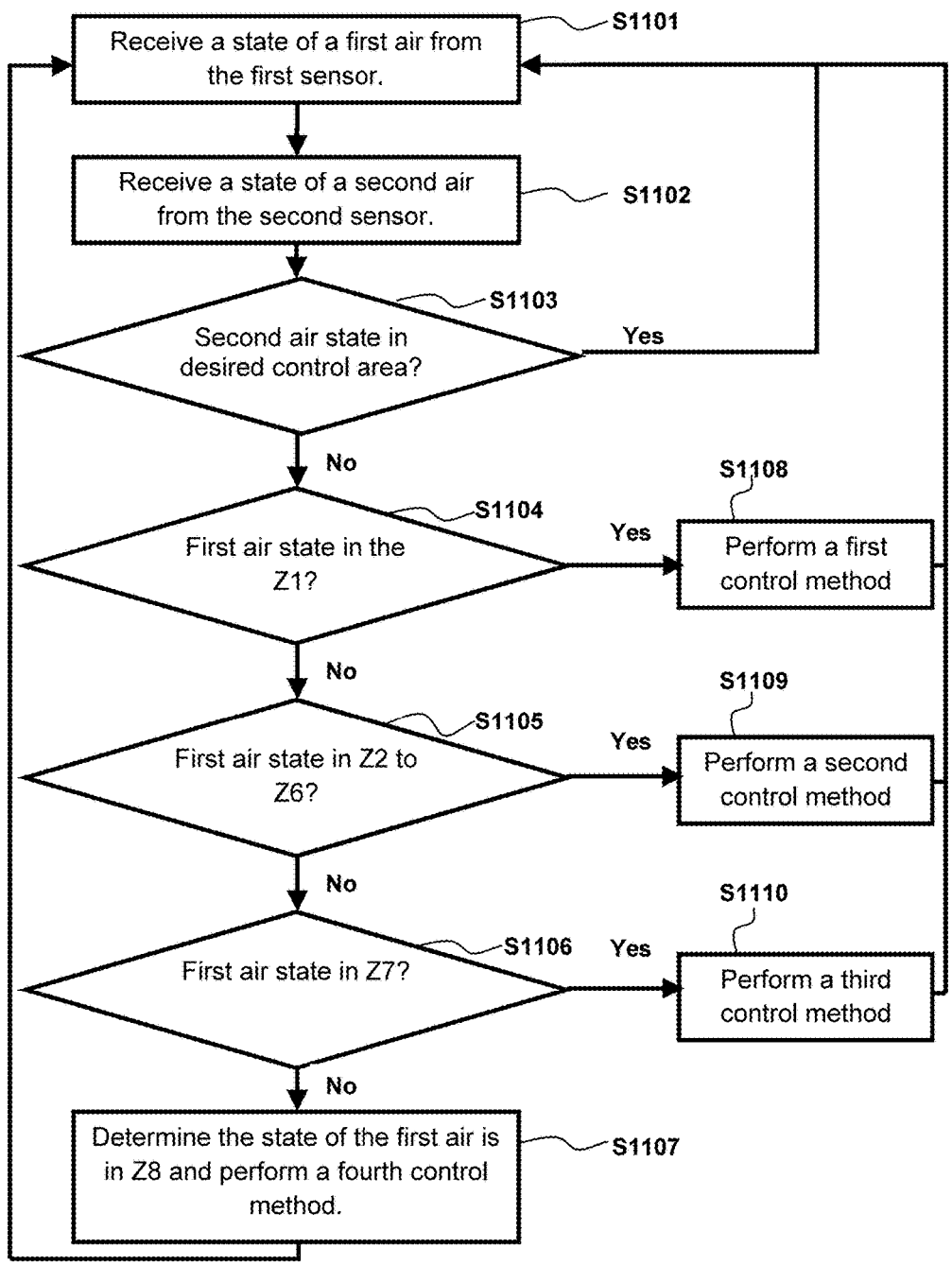
FIG. 11 is a flow chart illustrating air handling methods according to various exemplary embodiments.

FIG. 11 is a flow chart illustrating air handling methods according to various exemplary embodiments.

Referring to FIGS. 7-10 and 11, the control apparatus 800 may receive a state of a first air which is circulated through the first heat exchange path 112 from the first sensor 600 in block S1101. In other words, the first sensor 600 may detect the state of the first air and then send the state information to the control apparatus 800.

In block S1102, the control apparatus 800 may receive a state of a second air within the target space 10 from a second sensor 700. In other words, the second sensor 700 may detect the state of the second air and then send the state information to the control apparatus 800.

In determination block S1103, the control apparatus 800 may determine whether the state of the second air is in a control condition area. If the control apparatus 800 determines that the state of the second air is in a desired area such as the control condition area illustrated and described with reference to FIG. 3 (i.e., determination block S1103=Yes), then the control apparatus 800 may return to the beginning of the process steps illustrated in FIG. 11 and blocks S1101, S1102, and S1103 may repeat. For example, the control apparatus may continue to receive a state of the first air from the first sensor 600 in block S1101 and a state of the second air from the second sensor in block S1102 every second, minute, hour or any other interval. In this way, the control apparatus 800 has an accurate detected and timely state of the first and second air. Furthermore, the controller apparatus may use predictive algorithms based on the operations of equipment in the target space, the rate of temperature or humidity change in the first and second air, the season, weather forecast, etc. to determine whether state of the first air or state of the second air will change and take this into account along with the current state of the first and second air.

If the control apparatus 800 determines that the state of the second air is not in the desired area (i.e., determination block S1103=No), then the control apparatus may move to determination block S1104.

In determination block S1104, the control apparatus 800 may determine whether the state of the first air (e.g., outdoor air) is within a first zone Z1 as described and illustrated with respect to FIGS. 5 and 6. If the control apparatus 800 determines that the state of the first air is in the first zone Z1 (i.e., determination block S1104=Yes), then the control apparatus 800 may move to block S1108 and perform a first control method. The first control method was described and illustrated with respect to FIG. 7. Using the first control method, the control apparatus 800 may set the first circulation control part 230, second circulation control part 330, and/or some components thereof to an open mode or forced mode to operate the indirect heat exchanger 100 such that the first air cools the second air, which warm second air recirculates out of the target space 1, cools using the first air via the indirect heat exchanger 100, and then the cooled second air renters the target space 10. The control apparatus 800 may change the mode or speed of a circulation fan of the first circulation control part 230 and second circulation control part 330 based on the exact states of the first air and second air.

If the control apparatus 800 determines that the state of the first air is not in the first zone Z1 (i.e., determination block S1104=No), then the control apparatus 800 may move to determination block S1105.

In determination block S1105, the control apparatus 800 may determine whether the state of the first air is in any of the first zone Z1, second zone Z2, third zone Z3, fourth zone Z4, fifth zone Z5, or sixth zone Z6. If the control apparatus 800 determines that the state of the first air is in any of the first to sixth zones (i.e., determination block S1105=Yes), then the control apparatus 800 may move to block S1109 and perform a second control method. The second control method was described and illustrated with respect to FIG. 8 and involves the same first control method but also controls the vaporization part 120 to provide additional cooling to the indirect heat exchanger 100. Using the second control method, the control apparatus 800 may perform the same operations described with respect to the first control method as well as control the vaporization part 120 to inject liquid on the surface of the heat transfer medium 116 of the indirect heat exchanger 100 to cool the first air. The control apparatus 800 may change the mode or speed of a circulation fan of the first circulation control part 230 and second circulation control part 330 based on the exact states of the first air and second air. In addition, the control apparatus 800 may control the liquid injection rate of the vaporization part 120 based on the exact states of the first air and second air. For example, if the state of the first air is near the highest temperature within the second zone Z2 (e.g., 18 degrees Celsius) and then the control apparatus 800 may control the vaporization part 120 to have a high liquid injection flow rate compared to if the state of the first air is near the lowest temperature within the second zone (e.g., 15 degrees Celsius).

If the control apparatus 800 determines that the state of the first air is not in any of the second to sixth zones (i.e., determination block S1105=No), then the control apparatus 800 may move to determination block S1106.

In determination block S1106, the control apparatus 800 may determine whether the state of the first air is in a seventh zone Z7. If the control apparatus 800 determines that the state of the first air is in the seventh zone Z7 (i.e., determination block S1106=Yes), then the control apparatus 800 may move to block S1110 and perform a third control method. The second control method was described and illustrated with respect to FIG. 9 and involves the direct addition of first air into the target space 10 as well as the discharge or purge of the second air from the target space 10. Using the third control method, the control apparatus 800 may set the first circulation control part 230, second circulation control part 330, and/or some components thereof to a closed mode and set the outlet control unit 424 and intake control unit 414 and/or some components thereof to open mode or forced mode. The control apparatus 800 may change the mode or speed of a circulation fan of the outlet control unit 424 and intake control unit 414 based on the exact state of the first air and second air.

If the control apparatus 800 determines that the state of the first air is not in the seventh zone (i.e., determination block S1106=No), then the control apparatus 800 may move to block S1107.

In block S1108, the control apparatus 800 determines that the first air is in the eighth zone Z8 and performs the fourth control method. The fourth control method was described and illustrated with respect to FIG. 10 and involves the same second control method but also controls the direct adjusting apparatus 500 vaporization part 120 to provide additional cooling, heating, dehumidification, or humidification to second air. Using the fourth control method, the control apparatus 800 may perform the same operations described with respect to the second control method as well as control controls the direct adjusting apparatus 500 to directly adjust the state of the second air.

In other words, the control apparatus 800 may control at least one of circulation of the first air through the first heat exchange path 112, circulation of the second air through the second heat exchange path 114, liquid injection by the heat exchange part 110 for vaporization, circulation of heat exchange between the first air and the second air within the target space 10, and direct adjustment which cools, heats, dehumidifies, or humidifies the second air such that the state of the second air within the target space 10 remains within the control condition area.

Regardless of whether the control apparatus 800 operates under the first, second, third, or fourth control method, the control apparatus is repeatedly receiving a state of the first air from the first sensor 600, a state of the second air form the second sensor 700, weather forecast information as well as any other data for predictive purposes to determine whether which state the first air and second air is in and to change to operating condition and/or control method used to maintain the second air of the target space 10 within the control condition area of FIGS. 3 and 4.

FIG. 12 is a table showing an exemplary time ratio according to the climate classification of various zones. Herein, the table shown in FIG. 12 is based on data provided data from the Meteorological Administration of Korea. It shows the summed climate state of the Seoul area measured every hour during 2014.

Referring to FIG. 12, a time ratio controlled according to the first to fourth methods within certain region is 50.9%, 16.6%, 21.6%, and 10.9%, respectively. In other words, shown in the above table, air handling for the target space 10 may be performed by the air handling system with minimal energy use because the fourth method, which is expected to have the greatest energy consumption because it uses the air-conditioner, occupies only a proportion of about 11%.

Thus, using the detected state of the first air and the detected state of the second air, the control apparatus 800 may perform air handling for the target space 10 with minimal energy by controlling at least one of circulation of the first air, circulation of the second air, liquid injection for vaporization within the heat exchange part 110, circulation of air exchange of the first air and the second air within the target space 10, and direct adjusting which directly cools or heats the second air. In other words, the air handling for the target space 10 may be performed with less energy since the control apparatus 800 applies, according to the state of the first air and the second air, other methods beside that of directly cooling or heating the second air, of which energy consumption is high.

Also, since the target space 10 is separated from the external air when the air handling operation is performed by the first, second, and fourth methods, the humidity within the target space 10 may be maintained with little change. Therefore, an apparatus to control the humidity of the target space 10 may be unnecessary, or the usage time of the apparatus may be minimized, and the energy consumption normally accorded to such an apparatus may be reduced or eliminated.

When third control method is used to perform the air handling, energy consumption may also be minimize since the air of the target space 10 is replaced with the first air, which is external air.

The physical components used to implement the various logic or method steps described in this application may be implemented with the control apparatus 800, first sensor 600, second sensor 700, first circulation control part 230, second circulation control part 330, outlet control unit 424, intake control unit 414, direct adjusting apparatus 500, vaporization part 120, and/or one or more components thereof, may be implemented via one or more general purpose processor, digital signal processor (DSP), application specific integrated circuits (ASIC), a field programmable gate array (FPGA) or other programmable logic device, discrete circuits such a discrete grate or transistor logic, discrete hardware components or any combination thereof. A general purpose processor may be a multiprocessor or any conventional processor, controller, microcontroller, or state machine. A processor may also be implemented as any combination of computing apparatus such as a combination of DSP and a multiprocessor, a plurality of multiprocessors, one or more multiprocessors along with a DSP core. Alternatively, some methods or method steps may be implemented by specific circuitry.

In this manner, the features, functions, processes, etc., described herein may be implemented via software, hardware, firmware, or any combination thereof. If implemented in software, the functions may be stored as one or more instructions on a non-transitory computer readable medium or non-transitory processor-readable medium. The various steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include random access memory (RAM), read only memory (ROM), electrically erasable programmable read only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. An air handling system, comprising:
   an indirect heat exchanger comprising a heat exchange part comprising:
      a vaporization part configured to inject liquid into the heat exchange part;
      a first heat exchange path; and
      a second heat exchange path configured to exchange heat with the first heat exchange path and the vaporization part;
   a first circulation equipment connected to the first heat exchange path, the first circulation equipment is configured to circulate a first air through the first heat exchange path;
   a second circulation equipment connected to a target space and the second heat exchange path, the second circulation equipment is configured to circulate a second air through the second heat exchange path;
   a third circulation equipment configured to exchange the second air with the first air such that the first air is provided directly to the target space and blocked from the second heat exchange path and the second air is emitted from the target space;
   a direct adjusting apparatus configured to directly adjust the temperature of the second air;
   a first sensor configured to detect a state of the first air comprising a temperature and a humidity of the first air;
   a second sensor configured to detect a state of the second air comprising a temperature and a humidity of the second air; and
   a control apparatus configured to:
      receive the state of the first air from the first sensor;
      receive the state of the second air from the second sensor; and
      control at least one of a circulation of the first air within the first circulation equipment, a circulation of second air within the second circulation equipment, a liquid injection by the vaporization part, an exchange of the second air with the first air with the third circulation equipment, and a direct adjustment of the second air with the direct adjusting apparatus based on the received state of the first air detected by the first sensor and the received state of the second air detected by the second sensor,
   wherein the second circulation equipment comprises:
      a second supplying path part connected to an exit of the target space and an entrance of the second heat exchange path,
      a second outlet path part connected to an inlet of the target space and an exit of the second heat exchange path, and
      a second circulation control part disposed in at least one of the second supplying path part, and the second outlet path part, the second circulation control part configured to control the circulation of the second air of the second heat exchange path based on a signal received from the control apparatus.

2. The system of claim 1, wherein the control apparatus is further configured to control at least one of the circulation of the first air within the first circulation equipment, the circulation of second air within the second circulation equipment, the liquid injection by the vaporization part, the exchange of the second air with the first air with the third circulation equipment, and the direct adjustment of the second air with the direct adjusting apparatus such that the state of the second air within the target space is maintained within a control condition area of a psychrometric chart.

3. The system of claim 2, wherein the control apparatus is controlled by at least one of: a first control method which comprises controlling the circulation of the first air within the first circulation equipment and the circulation of the second air within the second circulation equipment such that heat of the first air and the second air are exchanged in the heat exchange part; a second control method which further comprises controlling the liquid injection in addition to the first method; a third control method which controls the exchange of the second air with the first air within the third circulation equipment; and a fourth control method which further comprises controlling the direct adjustment of the direct adjusting apparatus in addition to the second control method.

4. The system of claim 3, wherein at least one of the circulation of the first air within the first circulation equipment, the circulation of the second air within the second circulation equipment, or the exchange of the second air with the first air within the third circulation equipment comprises a circulation by natural convection or a circulation by forced air.

5. The system of claim 4, wherein the control condition area is defined by the state of second air that is equal to or greater than a first temperature, equal to or less than a second temperature, and equal to or less than a reference dew point.

6. The system of claim 5, wherein the control apparatus is configured to operate according to the first control method when the received state of the first air corresponds to a first zone that is less than a third temperature, which is less than the first temperature of the psychrometric chart.

7. The system of claim 6, wherein the control apparatus is configured to operate according to the second control method when the control apparatus determines that the state of the first air corresponds to at least one of:
  a second zone that is equal to or greater than the third temperature and equal to or less than the first temperature,
  a third zone that is equal to or greater than the first temperature, equal to or less than the second temperature, and equal or less than a first humidity,
  a fourth zone that is equal to or greater than the first temperature, equal to or less than the second temperature, greater than a second humidity, and equal to or less than the reference dew point,
  a fifth zone that is greater than the reference dew point, equal to or less than a heat exchange efficiency line of the psychrometric chart which indicates an efficiency of heat exchange between the first air and the second air of the heat exchange part, and
  a sixth zone that is greater than the second temperature, equal to or less than the reference dew point and equal to or less than a heat exchange efficiency line of the psychrometric chart.

8. The system of claim 5, wherein the control apparatus is configured to operate according to the third control method when the control apparatus determines that the state of the first air corresponds to a seventh zone within the psychrometric chart matching the control condition area.

9. The system of claim 5, wherein the control apparatus is configured to operate according to the fourth control method when the control apparatus determines that the state of the first air corresponds to an eighth zone that is outside from the control condition area and is greater than the heat exchange efficiency line of the psychrometric chart which indicates an efficiency of heat exchange between the first air and the second air of the heat exchange part.

10. The system of claim 7, wherein the first temperature is a range of 17 degrees Celsius to 19 degrees Celsius, the second temperature is a range of 26 degrees Celsius to 28 degrees Celsius, the third temperature is a range of 14 degrees Celsius to 16 degrees Celsius, the first humidity is a range of 19% to 21%, the second humidity is a range between 79% and 81%, and the reference dew point is a range of 20 degrees Celsius to 22 degrees Celsius.

11. The system of claim 1, wherein the indirect heat exchanger further comprises:
  a heat transfer medium disposed between the first heat exchange path and the second heat exchange path, the indirect heat exchanger is configured to transfer the heat between the first air flowing through the first heat exchange path and the second air flowing through the second heat exchange path, and
  the vaporization part is further configured to inject the liquid on a surface of the heat transfer medium which faces the first heat exchange path.

12. The system of claim 1, wherein the first circulation equipment comprises:
  a first supplying path part connected to an entrance of the first heat exchange path,
  a first outlet path part connected to an exit of the first heat exchange path, and
  a first circulation control part disposed in at least one of the first supplying path part and the first outlet path part, the first circulation control part is configured to control the circulation of the first air within the first heat exchange path based on a signal received from the control apparatus.

13. The system of claim 12, wherein the first circulation control part comprises a first circulation fan configured to circulate the first air.

14. The system of claim 1, wherein the second circulation control part comprises a second circulation fan which circulates the second air.

15. The system of claim 1, wherein the direct adjusting apparatus is disposed inside the second outlet path part.

16. The system of claim 1, wherein the third circulation equipment comprises:
  an air intake part configured to supply the first air to the target space, and
  an air outlet part configured to emit the second air from the target space.

17. The system of claim 16, wherein the air intake part comprises:
  an intake path connected to at least one of the target space and the second circulation equipment; and
  an intake control unit disposed inside the intake path, the intake control unit configured to control the supply of the first air to the target space based on a signal from the control apparatus.

18. The system of claim 16, wherein the air outlet part comprises:
  an outlet path connected to at least one of the target space and the second circulation equipment, and
  an outlet control unit disposed inside the outlet path, the outlet control unit configured to control the emission of the second air based on a signal from the control apparatus.

19. The system of claim 1, wherein the direct adjusting apparatus comprises an air conditioner configured to directly cool the second air.

20. The system of claim 1, wherein the direct adjusting apparatus is disposed inside at least one of the target space and the second circulation equipment.

21. The system of claim 1, wherein the second sensor is disposed inside the target space.

22. A method of handling air of an air handling system, comprising:
  receiving, by a control apparatus, a state of a first air from a first sensor, the state of the first air comprising a temperature of the first air;
  receiving, by the control apparatus, a state of a second air within a target space, the state of the second air comprising a temperature of the second air; and
  determining, by the control apparatus, whether the state of the second air is within a control condition area of a psychrometric chart;
  determining, by the control apparatus, whether the state of the first air is within a designated zone of the psychrometric chart;
  operating the air handling system based on the determinations by the control apparatus that the state of the second air is not within the control condition area of the psychrometric chart and the state of the first is within the designated zone of the psychrometric chart, wherein the control condition area is defined by the state of second air that is equal to or greater than a first temperature, equal to or less than a second temperature, and equal to or less than a reference dew point, wherein the control condition area is defined by the state of second air that is equal to or greater than a first temperature, equal to or less than a second temperature, and equal to or less than a reference dew point, wherein determining whether the state of the first air is within the designated zone of the psychrometric chart further comprises determining whether the state of the first air corresponds to at least one of:

a first zone that is less than a third temperature of the psychrometric chart and the third temperature is less than the first temperature, a second zone that is equal to or greater than the third temperature and equal to or less than the first temperature, a third zone that is equal to or greater than the first temperature, equal to or less than the second temperature, and equal to or less than a first humidity, a fourth zone that is equal to or greater than the first temperature, equal to or less than the second temperature, greater than a second humidity, and equal to or less than the reference dew point, a fifth zone that is greater than the reference dew point, equal to or less than a heat exchange efficiency line of the psychrometric chart which indicates an efficiency of heat exchange between the first air and the second air of a heat exchange part of the air handling system, a sixth zone that is greater than the second temperature, equal to or less than the reference dew point and equal to or less than the heat exchange efficiency line of the psychrometric chart, a seventh zone matching the control condition area, and an eighth zone that is outside from the control condition area and is greater than the heat exchange efficiency line, and wherein operating the air handling system further comprising: operating the air handling system in a third control mode based on a determination that the state of the first air corresponds the seventh zone, the operating of the air handling system in the third control mode comprising: exchanging the second air within the target space with the first air such that the first air is provided directly to the target space and blocked from the heat exchange part and the second air is emitted from the target space.

23. The method of claim 22, wherein operating the air handling system further comprising:

operating the air handling system in a first control mode based on a determination that the state of the first air corresponds to the first zone, the operating of the air handling system in the first control mode comprises:

circulating the first air through a first heat exchange path of the heat exchange part; and circulating the second air through a second heat exchange path of the heat exchange part such that second air exchanges heat with the first air within the heat exchange part.

24. The method of claim 23, wherein operating the air handling system further comprising:

operating the air handling system in a second control mode based on a determination that the state of the first air corresponds to at least one of the second zone, the third zone, the fourth zone, the fifth zone, and the sixth zone, the operating of the air handling system in the second control mode comprises:

circulating the first air through the first heat exchange path of the heat exchange part;

circulating the second air through the second heat exchange path of the heat exchange part such that second air exchanges heat with the first air within the heat exchange part; and injecting liquid into the heat exchange part to cool the first air.

25. The method of claim 24, wherein operating the air handling system further comprising:

operating the air handling system in a fourth control mode based on a determination that the state of the first air corresponds to an eighth zone, the operating of the air handling system in the fourth control mode comprises:

circulating the first air through the first heat exchange path of the heat exchange part;

circulating the second air through the second heat exchange path of the heat exchange part such that second air exchanges heat with the first air within the heat exchange part;

injecting liquid into the heat exchange part to cool the first air; and directly adjusting the second air.

26. The method of claim 25, wherein:

circulating the first air through the first heat exchange path during at least one of the first, second, and third control modes comprises circulating the first air by natural convection or by forced air, and circulating the second air through the second heat exchange path during at least one of the first, second, and third control modes comprises circulating the second air by natural convection or by forced air.

27. The method of claim 26, wherein the first temperature is a range of 17 degrees Celsius to 19 degrees Celsius, the second temperature is a range of 26 degrees Celsius to 28 degrees Celsius, the third temperature is a range of 14 degrees Celsius to 16 degrees Celsius, the first humidity is a range of 19% to 21%, the second humidity is a range of 79% to 81%, and the reference dew point is a range of 20 degrees Celsius to 22 degrees Celsius.

* * * * *